(12) United States Patent
Kozakura et al.

(10) Patent No.: US 12,055,233 B2
(45) Date of Patent: *Aug. 6, 2024

(54) ELECTROMAGNETIC VALVE UNIT

(71) Applicant: EAGLE INDUSTRY CO., LTD., Tokyo (JP)

(72) Inventors: Hideaki Kozakura, Tokyo (JP); Shuji Fukunaga, Tokyo (JP); Takafumi Yamanaka, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,570

(22) Filed: May 30, 2023

(65) Prior Publication Data
US 2023/0323977 A1 Oct. 12, 2023

Related U.S. Application Data

(62) Division of application No. 17/270,802, filed as application No. PCT/JP2019/035377 on Sep. 9, 2019, now Pat. No. 11,732,817.

(30) Foreign Application Priority Data

Sep. 10, 2018 (JP) .................................. 2018-169205

(51) Int. Cl.
*F16K 31/06* (2006.01)
*F16K 3/24* (2006.01)
*F16K 27/04* (2006.01)

(52) U.S. Cl.
CPC ............ *F16K 31/0613* (2013.01); *F16K 3/24* (2013.01); *F16K 27/048* (2013.01)

(58) Field of Classification Search
CPC ...... F16K 31/0613; F16K 3/24; F16K 27/048; F16K 27/029; F16K 2200/501; F16F 1/3732; F16F 9/3207; F16F 9/469
See application file for complete search history.

(56) References Cited

U.S. PATENT DOCUMENTS

2005/0211935 A1 9/2005 Yamamoto .............. F16K 31/02

FOREIGN PATENT DOCUMENTS

| DE | 4002882 | 8/1991 | ........... B60G 17/058 |
|----|---------|--------|-----------|
| JP | 59-39362 | 3/1984 | ............... F16J 15/10 |
| JP | 62-82473 | 5/1987 | ............. F16K 13/06 |
| JP | 3-98363 | 10/1991 | ............... F16J 15/10 |
| JP | 2000-18418 | 1/2000 | ............. F16K 31/06 |

(Continued)

OTHER PUBLICATIONS

International Search Report and Written Opinion issued in PCT/JP2019/035377, dated Oct. 31, 2019, with English translation, 15 pages.

(Continued)

*Primary Examiner* — Patrick C Williams
(74) *Attorney, Agent, or Firm* — HAYES SOLOWAY P.C.

(57) ABSTRACT

An electromagnetic valve unit held so as to be sandwiched between a receiving portion of a housing portion of control equipment and a pressing member includes a shoulder portion to be opposed to the receiving portion of the housing portion and an annular elastic member provided with a protruded portion to be inserted into a recessed portion formed at the shoulder portion. The annular elastic member is further provided with an annular deformation portion that is deformable in the axial direction so as not to press the protruded portion in the axial direction.

10 Claims, 11 Drawing Sheets

(56) References Cited

FOREIGN PATENT DOCUMENTS

| JP | 2005-201413 | 7/2005 | ............. | F16K 31/06 |
| JP | 2006-266486 | 10/2006 | ............. | F16K 31/06 |
| JP | 2015-102150 | 6/2015 | ............. | F16K 51/00 |

OTHER PUBLICATIONS

International Preliminary Report on Patentability issued in PCT/JP2019/035377, dated Mar. 9, 2021, with English translation, 8 pages.
Extended European Search Report issued in EPO Patent Appln. Serial No. 19859004.4-1015, dated May 23, 2022, 8 pages.
Chinese Official Action issued in Chinese Patent Application Serial No. 201980054902.4, dated Jun. 6, 2022, 10 pages.
Chinese Official Action issued in Chinese Patent Application Serial No. 201980054902.4, dated Jan. 19, 2023, 12 pages.
U.S. Appl. No. 17/270,802, filed Feb. 23, 2021, Kozakura et al.
European Official Action issued in EPO Patent Appln. Serial No. 19859004.4-1015, dated Feb. 15, 2024, 5 pages.

ELECTROMAGNETIC VALVE UNIT

CROSS REFERENCE TO RELATED APPLICATIONS

This application is a divisional application of U.S. patent application Ser. No. 17/270,802, filed Feb. 23, 2021, which in turn is a 371 filing based on PCT International Patent Application Serial No. PCT/JP2019/035377, filed Sep. 9, 2019, the contents of which are incorporated herein.

TECHNICAL FIELD

The present invention relates to an electromagnetic valve unit attached to control equipment and configured to control fluid inside.

BACKGROUND ART

Adjustment of the degree of opening of a flow path in control equipment and control of a fluid flow rate by an electromagnetic valve unit including a coil and a movable iron core has been generally performed. Most of these electromagnetic valve units have been used with the electromagnetic valve unit being housed and attached in, e.g., a housing portion facing the flow path of the control equipment configured to control fluid.

An electromagnetic valve unit described in Patent Citation 1 is housed in a bottomed tubular yoke. A valve sleeve is swaged to the yoke in a state in which the valve sleeve is pushed in from an opening side of the yoke, and the electromagnetic valve unit is placed with the electromagnetic valve unit being sandwiched by a bottom portion of the yoke and the valve sleeve. A wave washer is arranged between the bottom portion of the yoke and a body portion of the electromagnetic valve unit. Even if looseness is caused between the yoke and a swaging portion of the valve sleeve due to, e.g., aging, the body portion of the electromagnetic valve unit is pressed against the valve sleeve by repulsive force of the wave washer, and looseness of the body portion of the electromagnetic valve unit in the yoke is reduced.

Instead of, e.g., such a wave washer having high repulsive force, an elastic member arranged between a bottom portion of a housing portion of control equipment and the body portion of the electromagnetic valve unit, made of, e.g., rubber or synthetic resin, and having relatively-low repulsive force is also used. A ring-shaped elastic member 700 illustrated in FIG. 11 is held on a shoulder portion 200 of an electromagnetic valve unit 100 facing a bottom portion 140a of a housing portion 140 in control equipment 110. Specifically, the shoulder portion 200 is formed in such a manner that an upper-end-side corner portion of a body portion of the electromagnetic valve unit 100 is cut out in a circumferential direction, and is in a step shape including a horizontal surface 100b horizontally extending from an outer peripheral surface 100a of the body portion of the electromagnetic valve unit 100 in an inner diameter direction and a vertical surface 100c standing upward from an inner-diameter-side end portion of the horizontal surface 100b. The elastic member 700 is fitted onto the vertical surface 100c. According to such a configuration, the body portion of the electromagnetic valve unit 100 and the elastic member 700 are integrally inserted into the housing portion 140. Thus, there are advantages that not only the process of inserting the electromagnetic valve unit 100 is facilitated, but also high accuracy is not required for a pressing amount for pressing the electromagnetic valve unit 100 to a bottom portion 140a side of the housing portion 140.

CITATION LIST

Patent Literature

Patent Citation 1: JP 2015-102150 A (Page 8, FIG. 1)

SUMMARY OF INVENTION

Technical Problem

However, in a case where the elastic member 700 made of, e.g., rubber or synthetic resin is used as described in Patent Citation 1, if clamping force of the elastic member 700 is weak for the shoulder portion 200 of the electromagnetic valve unit 100, specifically for the vertical surface 100c, the electromagnetic valve unit 100 is twisted upon the processing of inserting the electromagnetic valve unit 100. There is a probability that when the elastic member 700 is pinched by the shoulder portion 200 and the bottom portion 140a of the housing portion 140 in a twisted state, the body portion of the electromagnetic valve unit 100 cannot be accurately attached to the housing portion 140. On the other hand, if the clamping force on the shoulder portion 200 of the elastic member 700, specifically on the vertical surface 100c, is strengthened, intrinsic stress of the elastic member 700 in a radial direction increases, leading to a problem that necessary repulsive force cannot be sufficiently ensured between the housing portion 140 and the shoulder portion 200 of the electromagnetic valve unit 100.

The present invention has been made in view of the above-described problem, and is intended to provide an electromagnetic valve unit configured so that in a state in which necessary repulsive force is sufficiently ensured between a housing portion of control equipment and the electromagnetic valve unit, the electromagnetic valve unit can be easily and accurately attached to the housing portion.

Solution to Problem

In order to solve the above-described problem, an electromagnetic valve unit of the present invention is an electromagnetic valve unit held so as to be sandwiched between a receiving portion of a housing portion of control equipment and a pressing member in an axial direction of the electromagnetic valve unit, including: a shoulder portion to be opposed to the receiving portion of the housing portion; and an annular elastic member provided with a protruded portion to be inserted into a recessed portion formed at the shoulder portion, wherein the annular elastic member is further provided with an annular deformation portion that is deformable in the axial direction of the electromagnet valve unit so as not to press the protruded portion in the axial direction. According to the aforesaid feature of the present invention, in the electromagnetic valve unit, the protruded portion of the annular elastic member is inserted into and fixed to the recessed portion of the shoulder portion, whereas the annular deformation portion of the annular elastic member not overlapping with the protruded portion in the axis line direction is deformed in the axial direction when the shoulder portion of the electromagnetic valve unit is pressed to a receiving portion side of the housing portion of the control equipment. Thus, the electromagnetic valve unit can be easily and accurately attached to the housing portion in a state in which sufficient repulsive force in the axial direction is ensured between the housing portion of the control equipment and the shoulder portion of the electromagnetic valve unit. Further, the protruded portion of the annular elastic member is inserted into and fixed to the recessed portion of the shoulder portion, and therefore, dropping of the annular elastic member from the shoulder portion of the electromagnetic valve unit due to, e.g., vibration upon conveyance or handling of the electromagnetic valve unit can be prevented.

It may be preferable that the deformation portion is to be arranged along an outer peripheral surface of the shoulder portion. According to this preferable configuration, e.g., twisting of the deformation portion is restricted by the shoulder portion, and therefore, the deformation portion can be accurately pinched between the shoulder portion and the receiving portion.

It may be preferable that the outer diameter of the deformation portion is smaller than the inner diameter of the housing portion. According to this preferable configuration, the electromagnetic valve unit can be easily inserted into the housing portion, and the deformation portion can be deformed in an outer diameter direction. Thus, a deformation tolerance of the deformation portion in the axial direction can be sufficiently ensured.

It may be preferable that the protruded portion is formed in an annular shape continuing in a circumferential direction, the recessed portion is formed in an annular shape continuing in the circumferential direction, and the protruded portion is inserted into the recessed portion. According to this preferable configuration, the annular elastic member can be held on the shoulder portion of the electromagnetic valve unit with favorable balance in the circumferential direction.

It may be preferable that the protruded portion is partially formed in the circumferential direction, the recessed portion is partially formed in the circumferential direction, and the protruded portion is press-fitted in the recessed portion. According to this preferable configuration, turning of the annular elastic member in the circumferential direction is restricted.

It may be preferable that the recessed portion is formed in the shoulder portion so as to be recessed in a radially inward direction with a wall portion remaining in the axial direction. According to this preferable configuration, the protruded portion is hooked on the wall portion when the annular elastic member moves in a detachment direction, and therefore, it is less likely to detach the annular elastic member from the shoulder portion.

It may be preferable that the recessed portion is formed in the shoulder portion so as to be recessed in the axial direction. According to this preferable configuration, attachment directions of the protruded portion and the deformation portion are the same as each other, and therefore, assembly of the annular elastic member with the shoulder portion is facilitated.

DESCRIPTION OF EMBODIMENTS

Hereinafter, modes for carrying out an electromagnetic valve unit according to the present invention will be described based on embodiments.

First Embodiment

An electromagnetic valve unit according to a first embodiment of the present invention will be described with reference to FIGS. 1 to 5. Hereinafter, a near side in the plane of paper of FIG. 1 will be described as a front side (or a forward side) of the electromagnetic valve unit, and right and left sides as viewed in FIG. 1 will be described as right and left sides of the electromagnetic valve unit.

The electromagnetic valve unit 1 of the present invention is, for example, provided at a vehicle such as an automobile. The electromagnetic valve unit 1 is attached to a buffer device 10 (also referred to as control equipment), which is configured to mitigate vibration transmitted from a road surface to a vehicle body during running and which is used together with a spring, to control the flow rate of fluid passing through a piston 14, thereby adjusting damping force provided by the buffer device 10.

Figure 1:
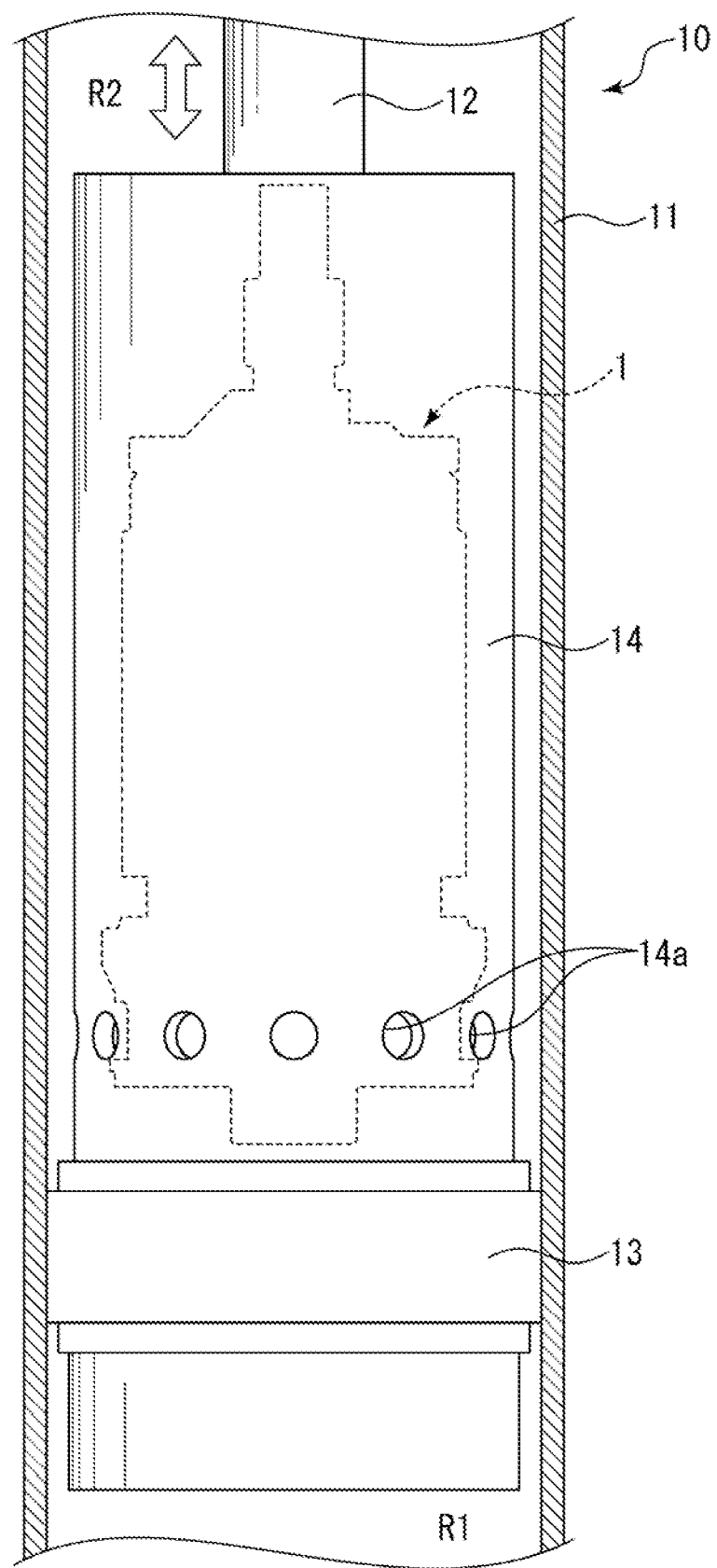
FIG. 1 is a schematic sectional view illustrating a buffer device including an electromagnetic valve unit according to a first embodiment of the present invention.

First, a configuration of the buffer device 10 will be described. As illustrated in FIG. 1, the buffer device 10 includes a tubular cylinder 11 housing the fluid, a piston rod 12 movable relative to the cylinder 11 in an axial direction, and the piston 14 provided at an end portion of the piston rod 12 and provided with a piston ring 13 at the outer periphery. The piston 14 divides a space inside the cylinder 11 into a first liquid chamber R1 and a second liquid chamber R2. The piston 14 is in a bottomed tubular shape opening downward (see FIG. 2), and multiple through-holes 14a penetrating the piston 14 in a radial direction are formed in a circumferential direction at positions above the piston ring 13.

Figure 2:
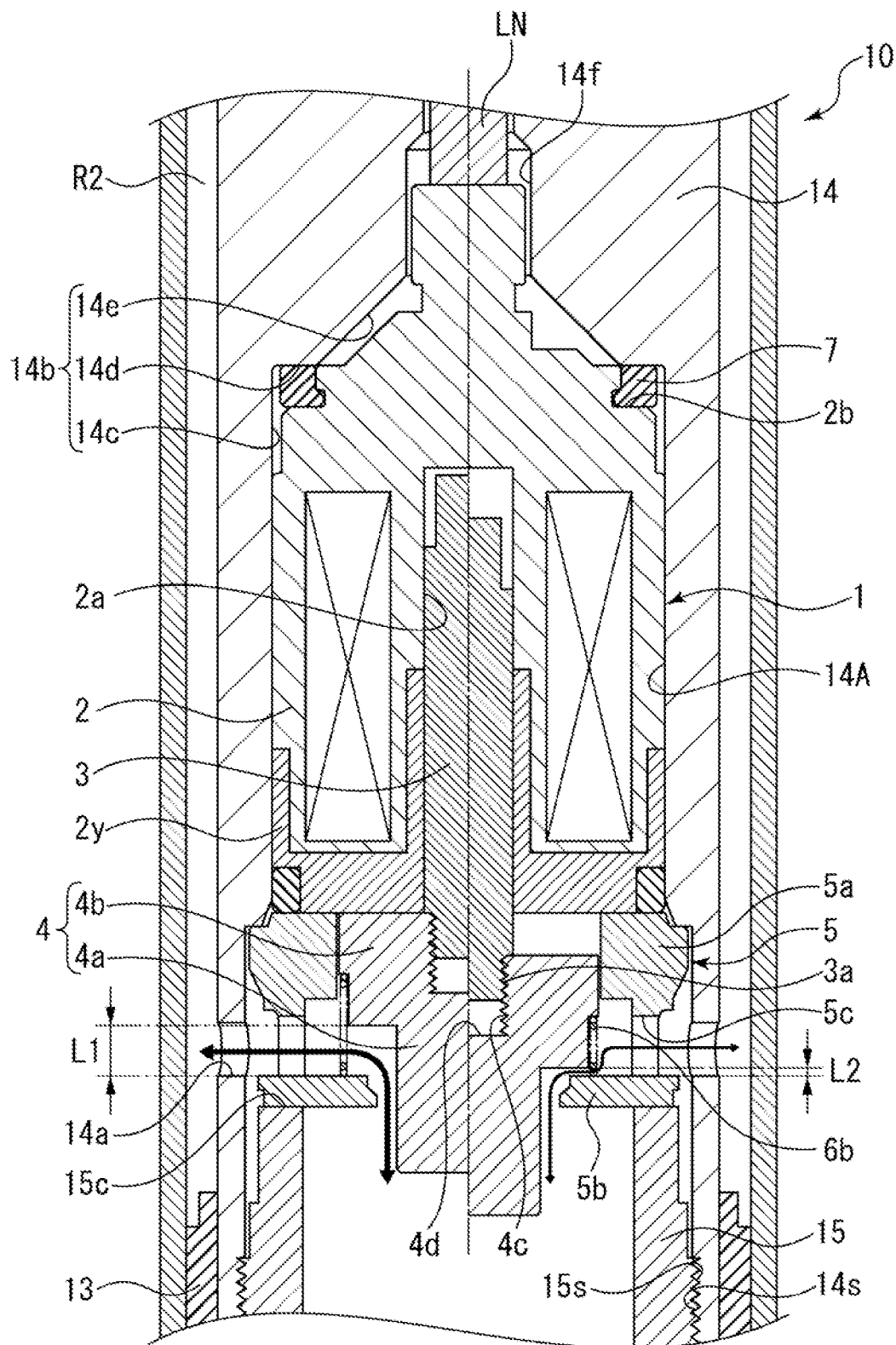
FIG. 2 is a front sectional view illustrating the electromagnetic valve unit in the first embodiment.

Moreover, as illustrated in FIG. 2, the electromagnetic valve unit 1 is housed in a housing recessed portion 14A as a housing portion of the piston 14, and a tubular body 15 as a pressing member including, at an outer peripheral surface, an external thread portion 15s to be screwed into an internal thread portion 14s provided at a lower-end-side inner peripheral surface of the piston 14 is screwed into and connected to a lower side with respect to the electromagnetic valve unit 1. The electromagnetic valve unit 1 is pressed against a step portion 14b provided at a bottom portion of the piston 14 by an upper end portion 15c of the tubular body 15. Note that the step portion 14b includes a tubular inner peripheral surface 14c forming the housing recessed portion 14A, a horizontal surface 14d as a receiving portion extending from an upper end of the inner peripheral surface 14c in an inner diameter direction, and an inclined surface 14e narrowed as extending upward from an inner-diameter-side edge of the horizontal surface 14d. The electromagnetic valve unit 1 is sandwiched by the horizontal surface 14d and the upper end portion 15c of the tubular body 15.

Further, a through-hole 14f penetrating the piston 14 in an upper-lower direction is formed at the step portion 14b of the piston 14, and is specifically formed above the inclined surface 14e. An electric wire LN configured to supply power to a later-described coil portion 2 is inserted into the through-hole 14f. Note that the electric wire LN is connected to an external power source through the inside of the piston rod 12.

Next, a configuration of the electromagnetic valve unit 1 will be described. The electromagnetic valve unit 1 mainly includes the coil portion 2, a solenoid rod 3 as a movable iron core to be moved up and down by the coil portion 2, a valve member 4 connected to a lower end portion of the solenoid rod 3, a tubular member 5 connected to a lower side of the coil portion 2, and an elastic member 7 attached to the coil portion 2.

The coil portion 2 is a mold coil that a coil is molded with a resin material, and a hole 2a opening downward is formed at a center portion of the coil portion 2. Moreover, a shoulder portion 2b is formed at an upper-end-side corner portion of the coil portion 2, and the elastic member 7 as a later-described ring-shaped annular elastic member is attached to the shoulder portion 2b. Note that the detailed shapes of the shoulder portion 2b and the elastic member 7 will be described later. Further, a stationary iron core 2y is arranged below the coil portion 2.

An external thread portion 3a is formed at a tip end portion (i.e., the lower end portion) of the solenoid rod 3, and a large portion of the solenoid rod 3 is housed in the hole 2a of the coil portion 2.

The valve member 4 is in a T sectional shape including a small diameter portion 4a and a large diameter portion 4b provided at an upper end of the small diameter portion 4a, and at an upper center portion of the valve member 4, a hole 4d opening upward and having an internal thread portion 4c at an inner peripheral surface is formed. The valve member 4 and the solenoid rod 3 are connected to each other by screwing of the internal thread portion 4c and the external thread portion 3a.

The tubular member 5 includes a tubular portion 5a fixed to a lower portion of the stationary iron core 2y and covering the valve member 4 and an annular valve seat portion 5b projecting from a lower end of the tubular portion 5a in the inner diameter direction. Note that the tubular member 5 may be formed integrally with the stationary iron core 2y. The inner diameter of the valve seat portion 5b is greater than that of the small diameter portion 4a of the valve member 4, and is smaller than that of the large diameter portion 4b of the valve member 4. Moreover, multiple through-holes 5c penetrating the tubular portion 5a in the radial direction are formed in the circumferential direction at the tubular portion 5a, and the through-holes 5c are provided at the substantially-same positions as those of the through-holes 14a of the piston 14 in the axial direction (i.e., the upper-lower direction) and are communicated with the through-holes 14a. Further, a spring 6b configured to bias the large diameter portion 4b of the valve member 4 and the valve seat portion 5b in a separation direction is arranged between the large diameter portion 4b and the valve seat portion 5b.

Next, adjustment of the damping force by the electromagnetic valve unit 1 will be described. In the electromagnetic valve unit 1, the through-holes 14a of the piston 14, the through-holes 5c of the tubular member 5, a lower-end-side opening of the tubular member 5 (i.e., the inside of the valve seat portion 5b), and the tubular body 15 form a flow path allowing communication between the first liquid chamber R1 and the second liquid chamber R2.

In a non-energization state of the coil portion 2, the solenoid rod 3 is biased upward by biasing force of the spring 6b, the large diameter portion 4b of the valve member 4 and the valve seat portion 5b are separated from each other, and a clearance between the large diameter portion 4b and the valve seat portion 5b is a dimension L1 (see the left side of the solenoid rod 3 of FIG. 2). In an energization state of the coil portion 2, the solenoid rod 3 moves downward against the biasing force of the spring 6b, the large diameter portion 4b of the valve member 4 and the valve seat portion 5b approach or contact each other, and the clearance between the large diameter portion 4b and the valve seat portion 5b is a dimension L2 smaller than the dimension L1 (see the right side of the solenoid rod 3 of FIG. 2).

That is, the electromagnetic valve unit 1 is configured such that the coil portion 2 is brought into the energization state to narrow the clearance (i.e., the flow path) between the large diameter portion 4b and the valve seat portion 5b and increase the damping force of the buffer device 10 and is brought into the non-energization state to ensure a great clearance between the large diameter portion 4b and the valve seat portion 5b and decrease the damping force of the buffer device 10.

Figure 3:
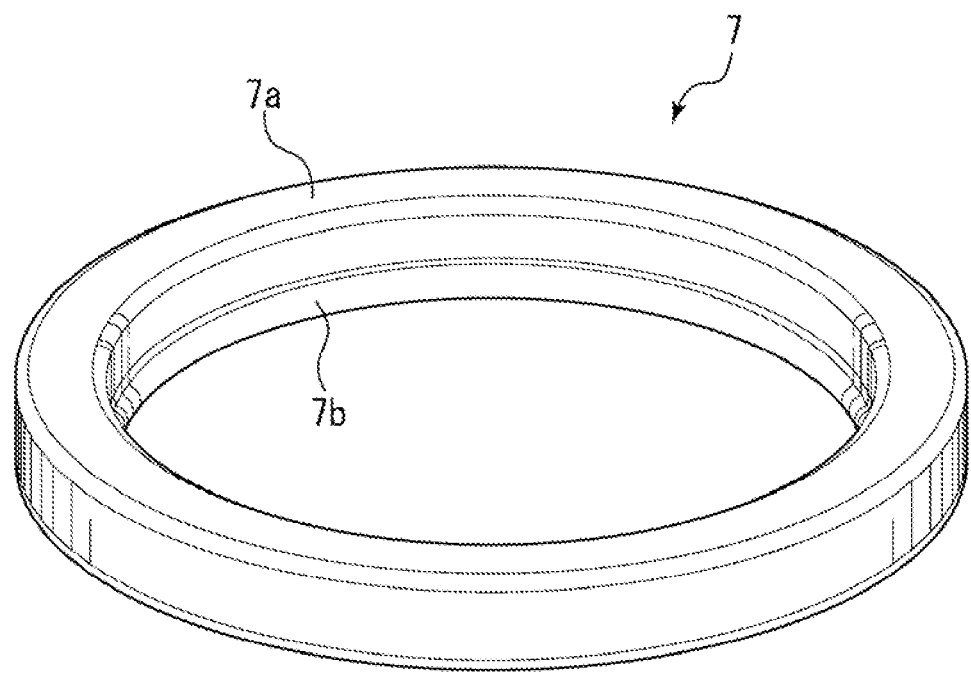
FIG. 3 is a perspective view illustrating an elastic member in the first embodiment.
Figure 4:
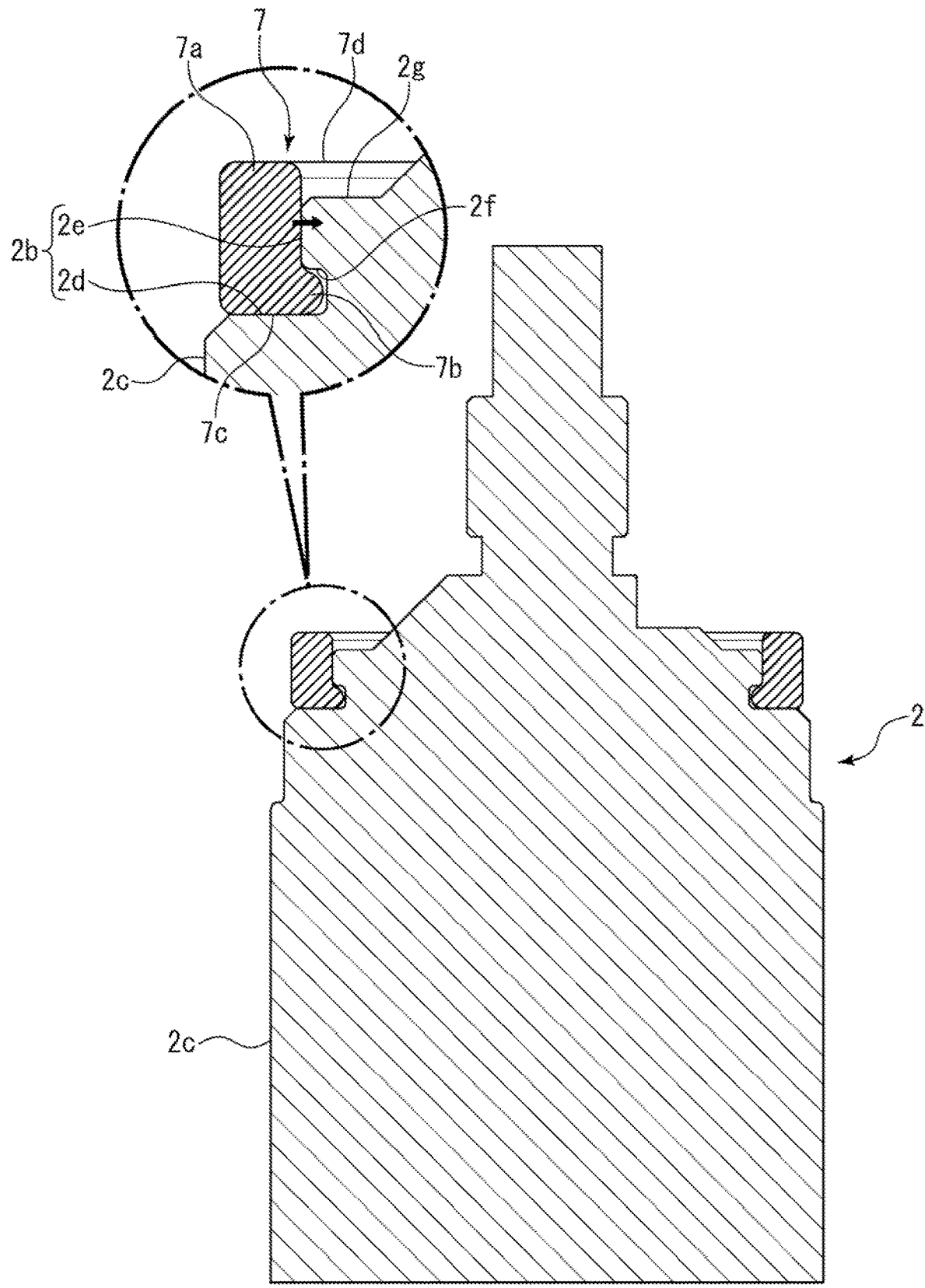
FIG. 4 is a front sectional view illustrating a state in which the elastic member in the first embodiment is attached to a shoulder portion of the electromagnetic valve unit.

Next, the elastic member 7 will be described. As illustrated in FIGS. 3 and 4, the elastic member 7 is an annular member made of, e.g., rubber or synthetic resin, and includes an annular portion 7a as a deformation portion having an elongated rectangular sectional shape and an annular protruded portion 7b protruding from a lower-end-side inner peripheral edge of the annular portion 7a in the inner diameter direction. The elastic member 7 is in an L shape as viewed in the section.

The shoulder portion 2b of the coil portion 2 is in such a shape that the upper-end-side corner portion of the coil portion 2 is cut out in the circumferential direction, and is in a step shape including a horizontal surface 2d horizontally extending from an outer peripheral surface 2c of the coil portion 2 in the inner diameter direction and a vertical surface 2e standing upward from an inner-diameter-side end portion of the horizontal surface 2d. Moreover, an annular recessed portion 2f recessed in the inner diameter direction is formed at a lower end of the vertical surface 2e.

The elastic member 7 is configured such that the annular portion 7a is fitted onto the vertical surface 2e and the protruded portion 7b is attached to the shoulder portion 2b with the protruded portion 7b being inserted into the recessed portion 2f. In a state in which the elastic member 7 is attached to the shoulder portion 2b, a lower surface 7c of the annular portion 7a contacts the horizontal surface 2d, and an upper surface 7d of the annular portion 7a is arranged above an upper surface 2g of the shoulder portion 2b. That is, the upper-lower dimension of the annular portion 7a is greater than the upper-lower dimension of the vertical surface 2e. Moreover, the outer diameter of the vertical surface 2e of the shoulder portion 2b is slightly longer than the inner diameter of the annular portion 7a of the elastic member 7.

As described above, the elastic member 7 can be reliably attached to the shoulder portion 2b of the coil portion 2 by clamping force (see a black arrow in an enlarged portion of FIG. 4) of the annular portion 7a in the inner diameter direction and the protruded portion 7b inserted into the recessed portion 2f. Further, the protruded portion 7b is inserted into the annular recessed portion 2f across the circumferential direction. Thus, it is less likely to detach the elastic member 7 from the coil portion 2, and the elastic member 7 can be attached to the shoulder portion 2b of the electromagnetic valve unit 1 with substantially-uniform holding force in the circumferential direction by the clamping force of the annular portion 7a in the inner diameter direction. Particularly, since the protruded portion 7b is inserted into the recessed portion 2f, the protruded portion 7b is hooked on an upper wall portion of the recessed portion 2f. Thus, even if external force in a detachment direction (e.g., an upper direction) acts on the elastic member 7 upon delivery or transportation of the electromagnetic valve unit 1, detachment of the elastic member 7 from the shoulder portion 2b can be prevented.

Figure 5:
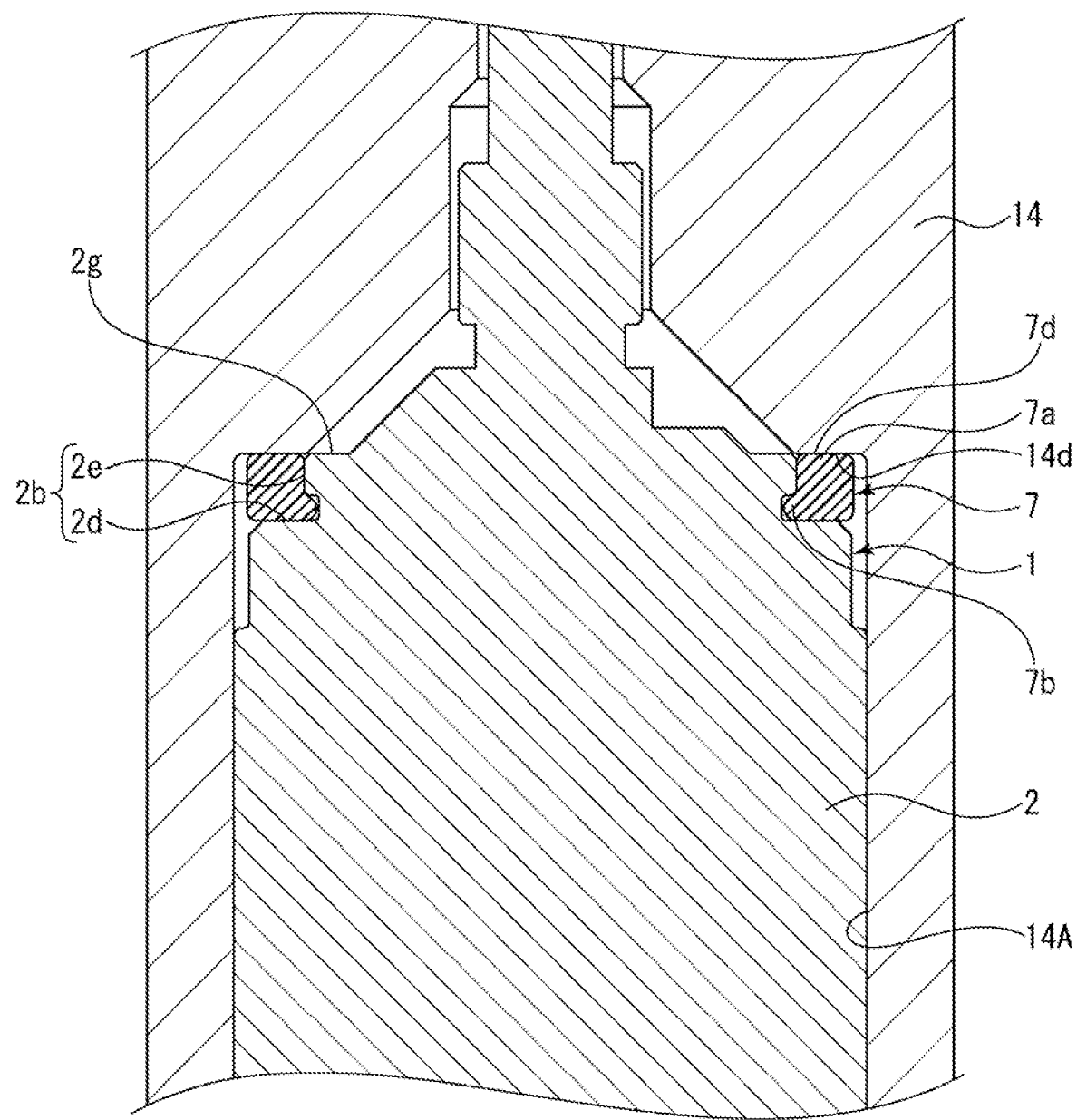
FIG. 5 is a front sectional view illustrating a state in which the electromagnetic valve unit in the first embodiment is attached to a housing.

As illustrated in FIG. 5, in a state in which the electromagnetic valve unit 1 is housed in the housing recessed portion 14A of the piston 14 and the tubular body 15 is screwed into and connected to the piston 14 (see FIG. 2), the electromagnetic valve unit 1 is pushed up from below by the tubular body 15, and the annular portion 7a of the elastic member 7 is, in the upper-lower direction, sandwiched between the horizontal surface 14d of the piston 14 and the horizontal surface 2d of the shoulder portion 2b.

As described above, the protruded portion 7b of the elastic member 7 is inserted into and fixed to the recessed portion 2f of the shoulder portion 2b, whereas the annular portion 7a is deformed in the axial direction when the electromagnetic valve unit 1 is pressed to a horizontal surface 14d side of the housing recessed portion 14A. Thus, the electromagnetic valve unit 1 can be easily and accurately attached to the housing recessed portion 14A in a state in which sufficient repulsive force is ensured between the housing recessed portion 14A and the electromagnetic valve unit 1.

Specifically, since the protruded portion 7b is inserted into the recessed portion 2f, the elastic member 7 is fixed not to drop from the shoulder portion 2b. Thus, it is enough to ensure a small function (i.e., small clamping force) of holding the annular portion 7a on the shoulder portion 2b, and intrinsic stress of the annular portion 7a in the radial direction can be decreased. Thus, the annular portion 7a can be accurately and sufficiently deformed in the axial direction, and sufficient repulsive force can be ensured between the housing recessed portion 14A and the electromagnetic valve unit 1. With this configuration, even if screwing and connection between the piston 14 and the tubular body 15 are loosened due to, e.g., aging, the electromagnetic valve unit 1 can be pressed against the tubular body 15 by repulsive force of the annular portion 7a, and therefore, rattling of the electromagnetic valve unit 1 in the housing recessed portion 14A can be reduced. Moreover, the annular portion 7a has relatively-lower repulsive force than, e.g., that of a typical wave washer, and it is enough to ensure small force when the electromagnetic valve unit 1 is pressed to the horizontal surface 14d side of the housing recessed portion 14A and no high attachment accuracy is required. Thus, the electromagnetic valve unit 1 can be easily attached to the housing recessed portion 14A. Note that the annular portion 7a does not overlap with the protruded portion 7b in an axis line direction, and therefore, intrinsic stress of the protruded portion 7b provides no influence on deformation of the annular portion 7a in the axial direction. In other words, the annular portion 7a is deformable in the axial direction so as not to press the protruded portion 7b in the axial direction.

Moreover, the annular portion 7a is arranged along the vertical surface 2e of the shoulder portion 2b, and therefore, when the electromagnetic valve unit 1 is inserted into the housing recessed portion 14A, e.g., twisting of the annular portion 7a can be restricted by the shoulder portion 2b and the annular portion 7a can be accurately pinched between the shoulder portion 2b and the horizontal surface 14d.

Further, the outer diameter of the annular portion 7a is smaller than the inner diameter of the housing recessed portion 14A, and therefore, a clearance is formed between the annular portion 7a and the inner peripheral surface 14c of the housing recessed portion 14A. According to such a configuration, when the electromagnetic valve unit 1 is inserted into the housing recessed portion 14A, the annular portion 7a does not contact the inner peripheral surface 14c of the housing recessed portion 14A, and therefore, the electromagnetic valve unit 1 is easily inserted into the housing recessed portion 14A.

In addition, when the annular portion 7a is pinched by the horizontal surface 14d and the horizontal surface 2d, the annular portion 7a can be deformed in an outer diameter direction, and therefore, a deformation tolerance of the annular portion 7a in the upper-lower direction can be sufficiently ensured. With this configuration, the repulsive force of the annular portion 7a in the upper-lower direction can be increased, and the horizontal surface 2d of the electromagnetic valve unit 1 and the horizontal surface 14d of the housing recessed portion 14A can be arranged close to each other. Thus, the dimension of the buffer device 10 in the upper-lower direction can be compact. Note that in the present embodiment, the upper surface 7d of the annular portion 7a is at the same height as that of the upper surface 2g of the shoulder portion 2b in a state in which the annular portion 7a is pinched.

Note that in the first embodiment, the form in which the protruded portion 7b is inserted, specifically loosely fitted, into the recessed portion 2f and the elastic member 7 and the shoulder portion 2b are fixed by the clamping force of the annular portion 7a in the inner diameter direction has been described by way of example, but the protruded portion 7b may be press-fitted in the recessed portion 2f. In this case, the annular portion 7a may be placed apart from the vertical surface 2e of the shoulder portion 2b. That is, the elastic member 7 may be attached to the shoulder portion 2b in a state in which no stress in the radial direction is on the annular portion 7a. Alternatively, the elastic member 7 may be attached to the shoulder portion 2b by repulsive force of the protruded portion 7b press-fitted in the recessed portion 2f and the additionally-acting clamping force of the annular portion 7a in the inner diameter direction.

Second Embodiment

Next, an electromagnetic valve unit according to a second embodiment of the present invention will be described with reference to FIGS. 6 to 8. Note that configuration description overlapping with that of the above-described embodiment will be omitted.

Figure 6:
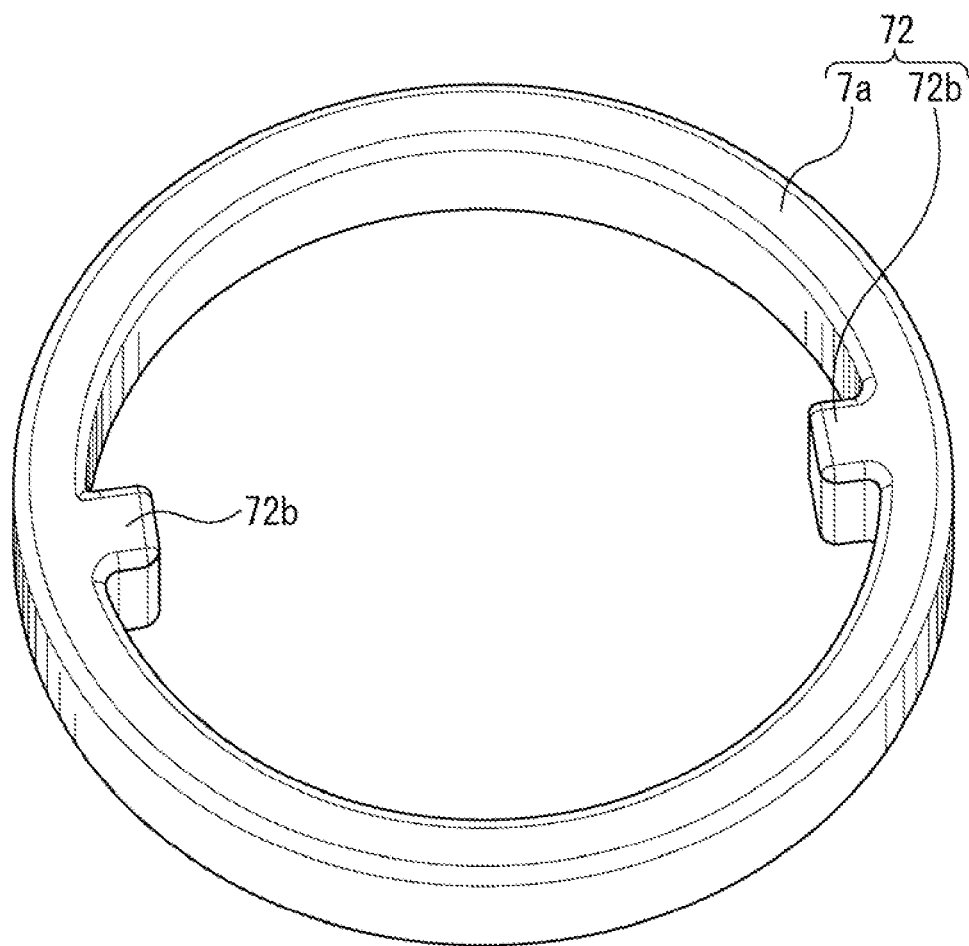
FIG. 6 is a perspective view illustrating an elastic member of an electromagnetic valve unit according to a second embodiment of the present invention.

As illustrated in FIG. 6, an elastic member 72 in the second embodiment is configured such that protruded portions 72b protruding from an annular portion 7a having an elongated rectangular sectional shape in an inner diameter direction are provided at positions facing each other with respect to the center axis of the annular portion 7a. The protruded portions 72b have the same height as that of the annular portion 7a.

Figure 7:
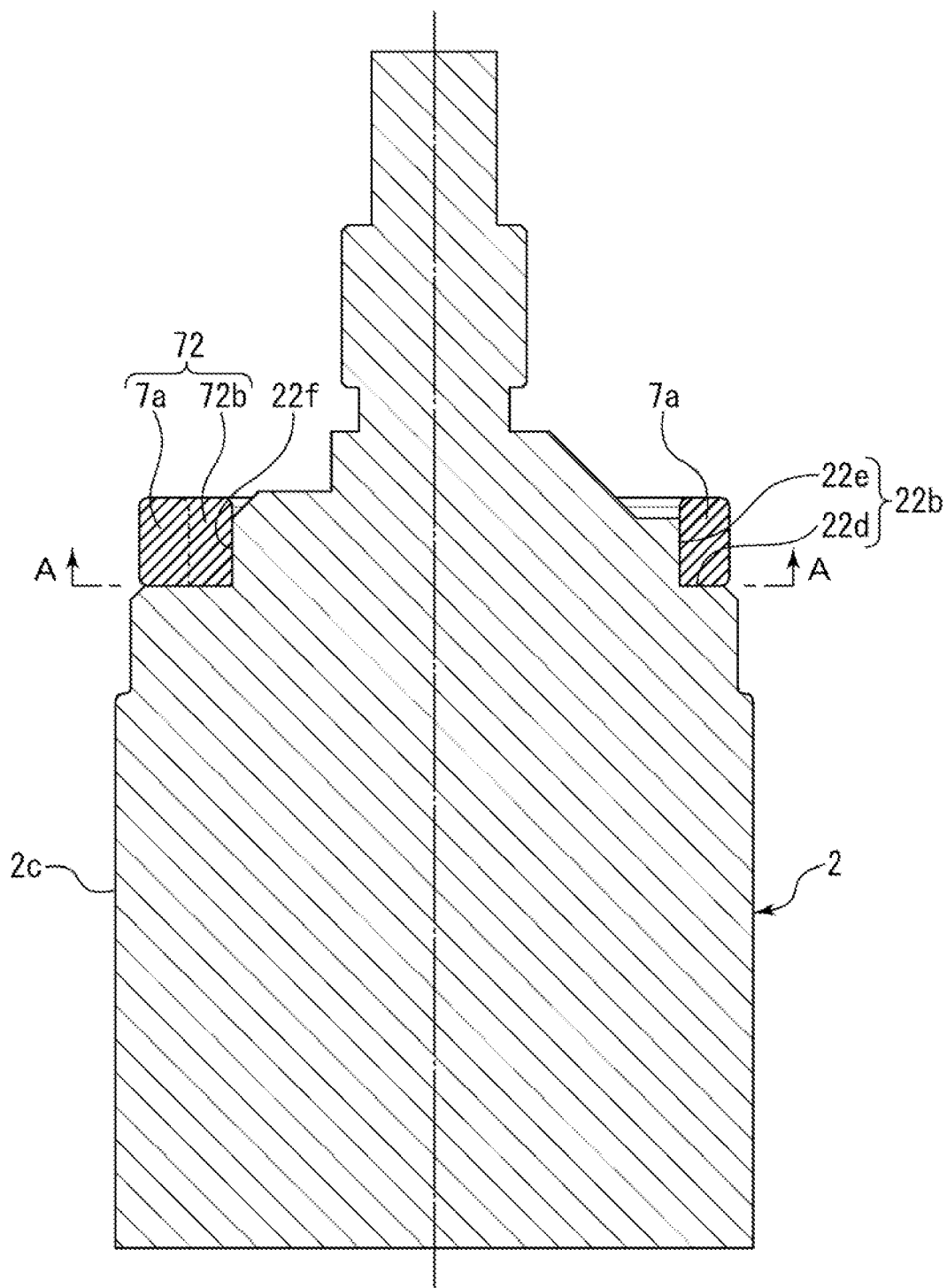
FIG. 7 is a front sectional view illustrating a state in which the elastic member in the second embodiment is attached to a shoulder portion of an electromagnetic valve unit.
Figure 8:
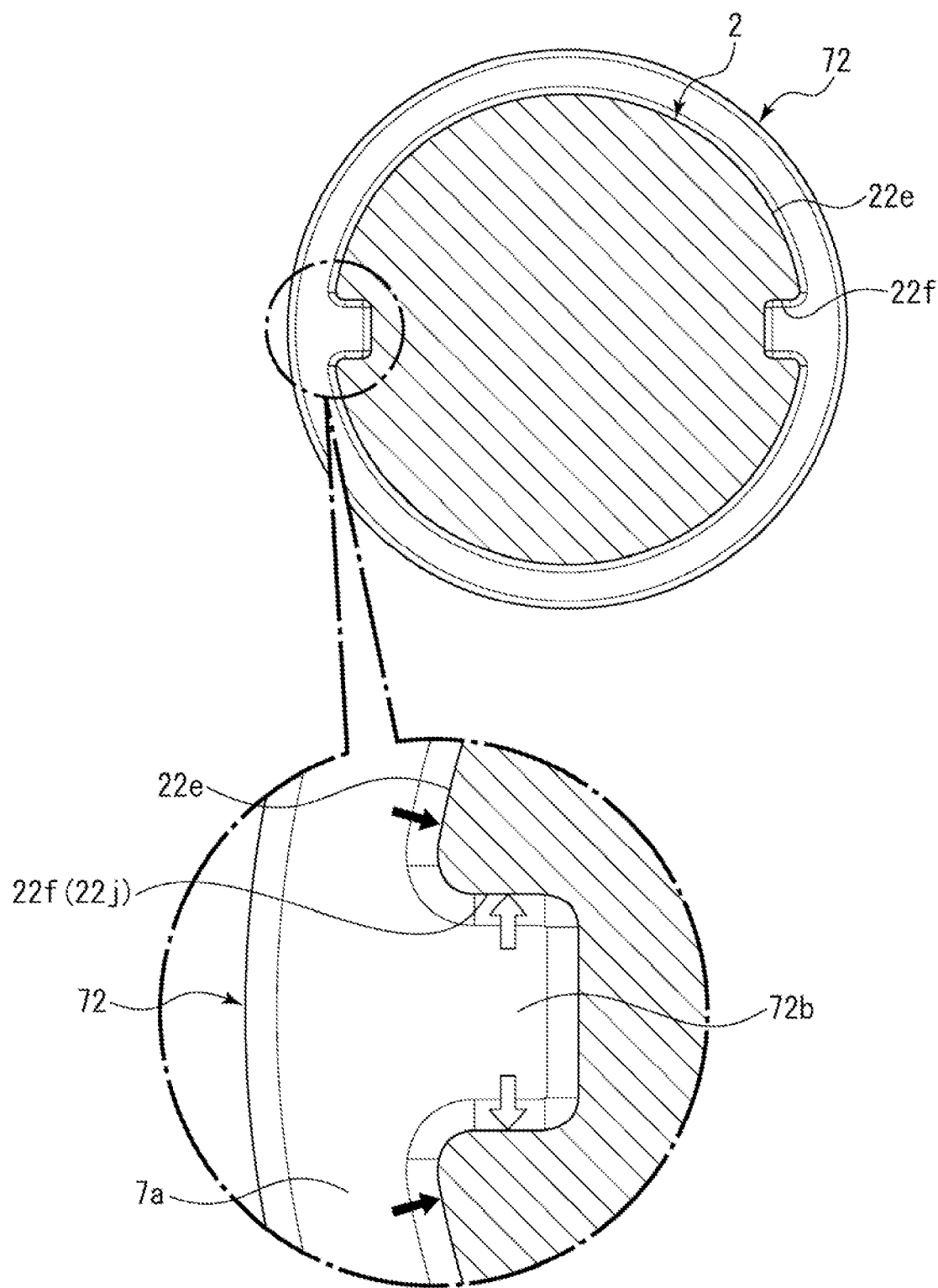
FIG. 8 is an A-A sectional view of FIG. 7.

As illustrated in FIGS. 7 and 8, the elastic member 72 is attached to a shoulder portion 22b of a coil portion 2. Specifically, the shoulder portion 22b is in a step shape including a horizontal surface 22d horizontally extending from an outer peripheral surface 2c of the coil portion 2 in the inner diameter direction and a vertical surface 22e standing upward from an inner-diameter-side end portion of the horizontal surface 22d. Moreover, at the vertical surface 22e, recessed portions 22f recessed in the inner diameter direction are provided at positions facing each other with respect to the center axis. The recessed portions 22f are cut out to open in an upper direction and an outer diameter direction. Note that the left side in the plane of paper of FIG. 7 illustrates a state in which the coil portion 2 is cut at the position of the protruded portion 72b, and the right side in the plane of paper illustrates a state in which the coil portion 2 is cut at a position different from the position of the protruded portion 72b.

Each protruded portion 72b of the elastic member 72 is press-fitted in the recessed portion 22f of the shoulder portion 22b, and the annular portion 7a is fitted onto the vertical surface 22e. According to such a configuration, the elastic member 72 can be reliably attached to the shoulder portion 22b of the coil portion 2 by repulsive force (see white arrows in an enlarged portion of FIG. 8) of the protruded portion 72b, which is press-fitted in the recessed portion 22f, in a circumferential direction and additionally-acting clamping force (see black arrows in the enlarged portion of FIG. 8) of the annular portion 7a in the inner diameter direction. Note that the annular portion 7a and the protruded portions 72b do not overlap with each other, and therefore, intrinsic stress of the protruded portions 72b provides no influence on deformation of the annular portion 7a in an axial direction.

Moreover, the protruded portions 72b contact wall portions 22j of the recessed portions 22f in the circumferential direction, and therefore, relative turning of the elastic member 72 and the coil portion 2 is restricted. Note that the recessed portion 22f opens in the upper direction, and therefore, the elastic member 72 can be attached to the shoulder portion 22b from above and attachment of the elastic member 72 is facilitated without the need for arranging the elastic member 72 after diameter expansion thereof.

Note that in the second embodiment, the form in which two protruded portions 72b of the elastic member 72 and two recessed portions 22f of the shoulder portion 22b are provided has been described by way of example, but the number of protruded and recessed portions and the sizes of the protruded and recessed portions can be freely changed.

Third Embodiment

Next, an electromagnetic valve unit according to a third embodiment of the present invention will be described with reference to FIGS. 9 and 10. Note that configuration description overlapping with those of the above-described embodiments will be omitted.

Figure 9:
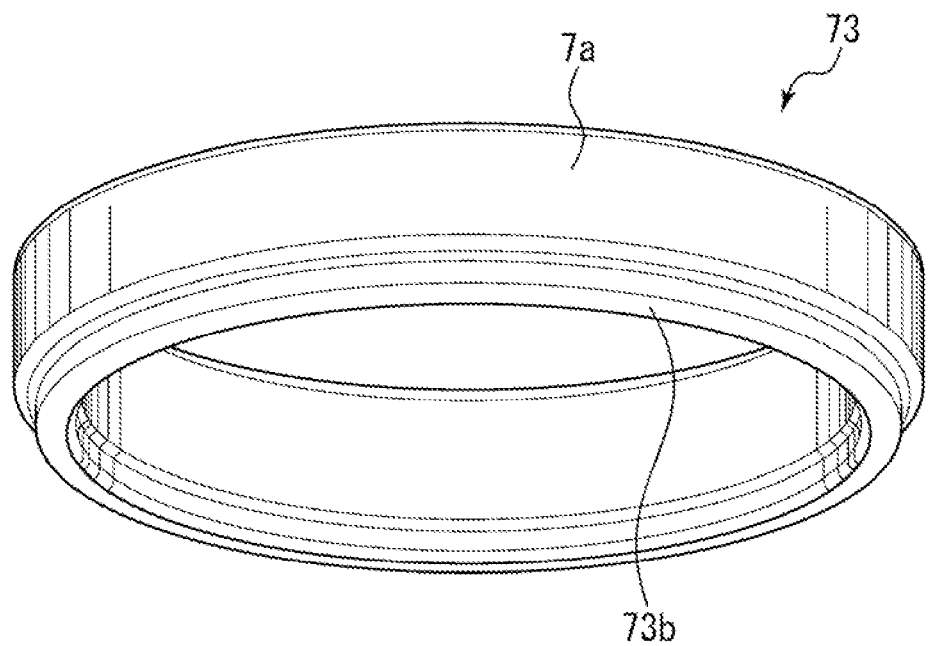
FIG. 9 is a perspective view illustrating an elastic member of an electromagnetic valve unit according to a third embodiment of the present invention.

As illustrated in FIG. 9, an elastic member 73 in the third embodiment is configured such that a protruded portion 73b protruding downward from a center portion of a lower surface 7c of an annular portion 7a, which has an elongated rectangular sectional shape, in a radial direction is formed in an annular shape along the annular portion 7a. That is, the annular portion 7a is formed wider in the radial direction than the protruded portion 73b, and from an outer diameter side to an inner diameter side as indicated by a virtual chain line in FIG. 10 for the sake of convenience in description, an outer-diameter-side deformation portion 71a not overlapping with the protruded portion 73b in an axial direction, an intermediate portion 71c overlapping with the protruded portion 73b in the axial direction, and an inner-diameter-side deformation portion 71b not overlapping with the protruded portion 73b in the axial direction are positioned.

Figure 10:
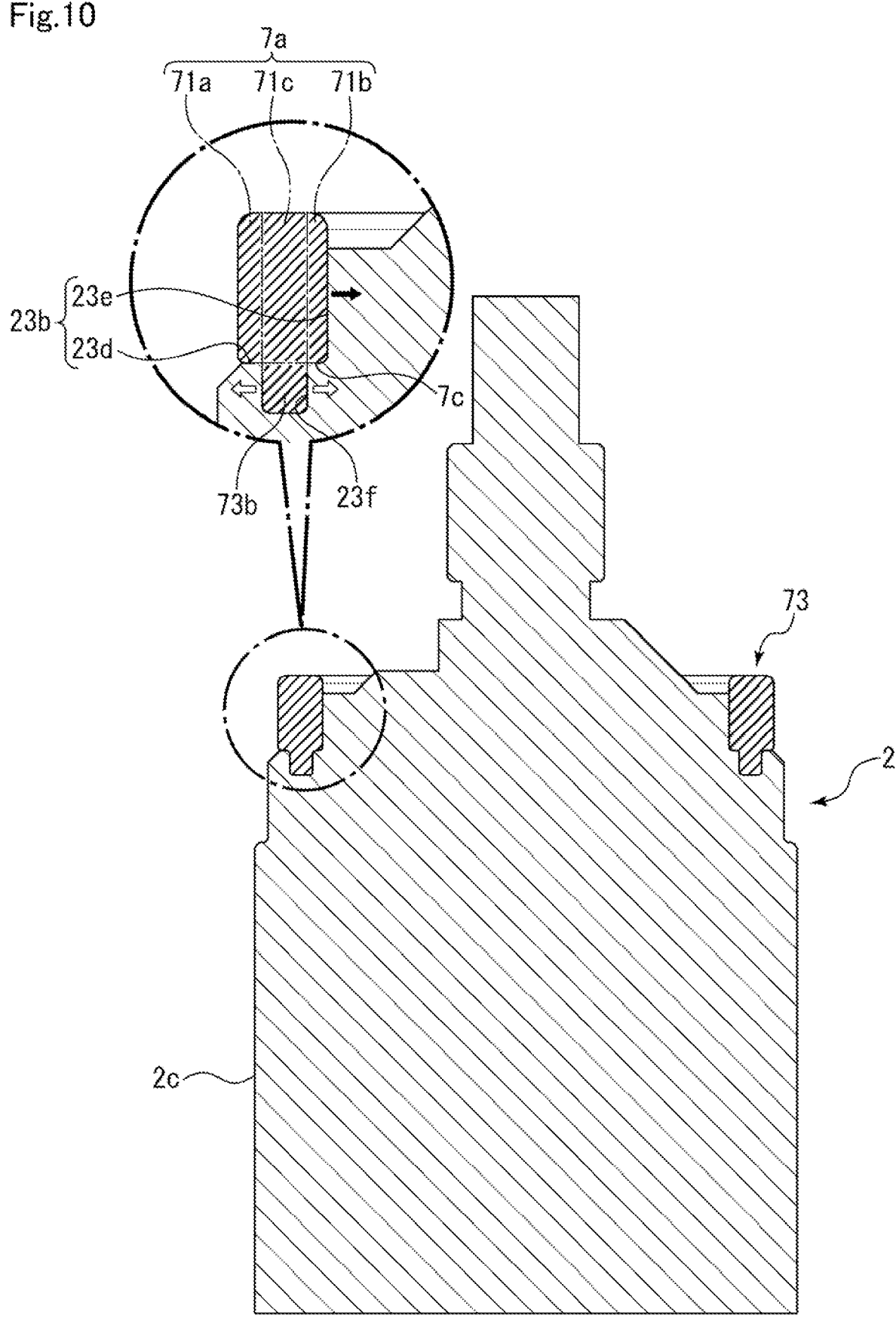
FIG. 10 is a front sectional view illustrating a state in which the elastic member in the third embodiment is attached to a shoulder portion of an electromagnetic valve unit.
Figure 11:
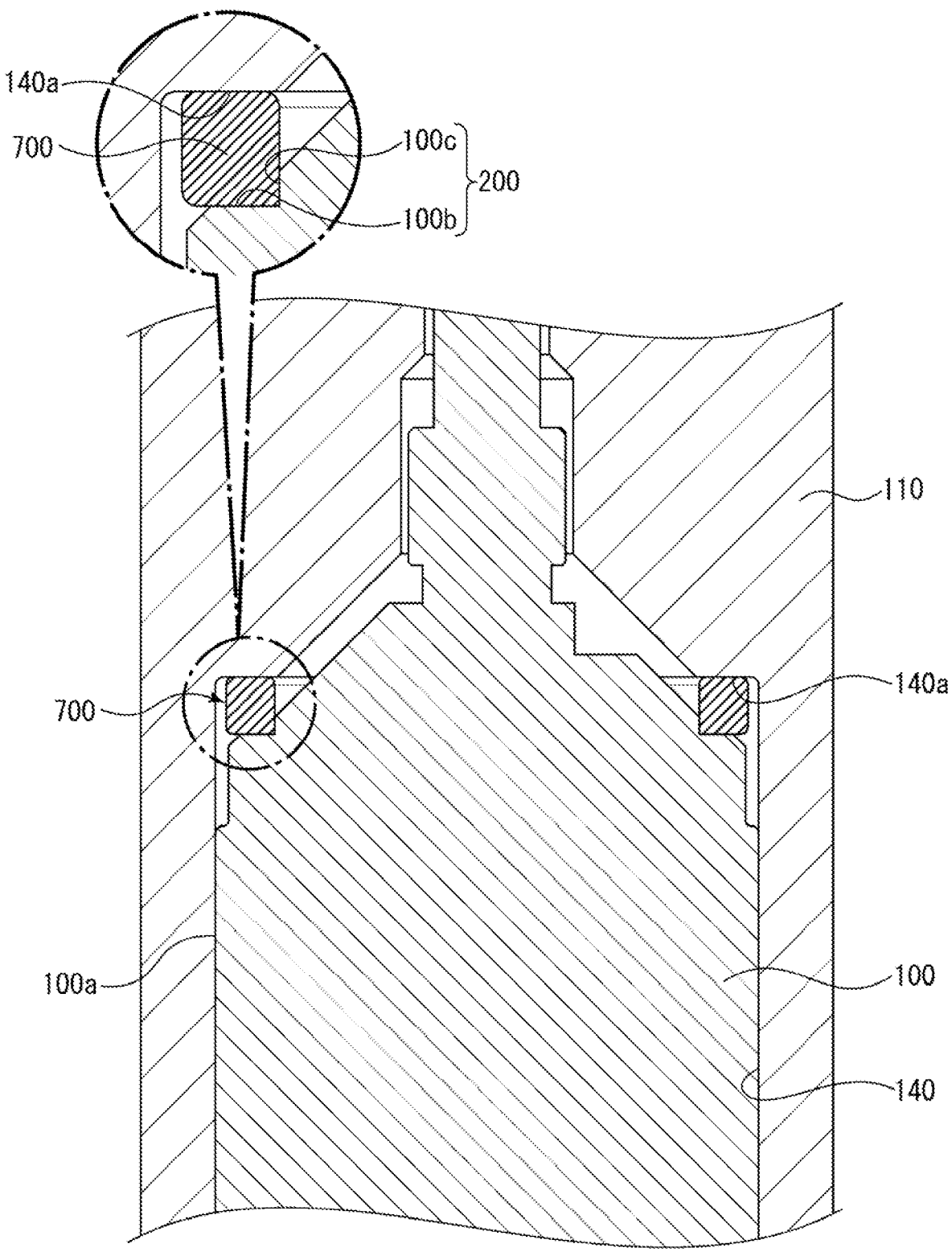
FIG. 11 is a front sectional view illustrating a state in which an elastic member in a typical example is attached to a shoulder portion of a conventional electromagnetic valve unit.

As illustrated in FIG. 10, the elastic member 73 is attached to a shoulder portion 23b of a coil portion 2. Specifically, the shoulder portion 23b is in a step shape including a horizontal surface 23d horizontally extending from an outer peripheral surface 2c of the coil portion 2 in an inner diameter direction and a vertical surface 23e standing upward from an inner-diameter-side end portion of the horizontal surface 23d, and an annular recessed portion 23f is formed along the horizontal surface 23d.

The protruded portion 73b of the elastic member 73 is press-fitted in the recessed portion 23f of the shoulder portion 23b, and an annular portion 7a is fitted onto the vertical surface 23e. According to such a configuration, the elastic member 73 can be reliably attached to the shoulder portion 23b of the coil portion 2 by repulsive force (see white arrows in an enlarged portion of FIG. 10) of the protruded portion 73b, which is press-fitted in the recessed portion 23f, in the radial direction and additionally-acting clamping force (see a black arrow in the enlarged portion of FIG. 10) of the annular portion 7a in the inner diameter direction. Moreover, attachment directions of the protruded portion 73b and the annular portion 7a are the same as each other (i.e., both corresponding to an upper-lower direction in this embodiment), and therefore, it is not necessary to greatly diameter-expand the protruded portion 73b and assembly of the elastic member 73 with the shoulder portion 23b is facilitated. Further, the outer-diameter-side deformation portion 71a and the inner-diameter-side deformation portion 71b do not overlap with the protruded portion 73b in an axis line direction, and therefore, intrinsic stress of the protruded portion 73b provides no influence on deformation of the outer-diameter-side deformation portion 71a and the inner-diameter-side deformation portion 71b in the axial direction.

The embodiments of the present invention have been described above with reference to the drawings, but specific configurations are not limited to these embodiments. Even changes and additions made without departing from the scope of the present invention are included in the present invention.

For example, in the first to third embodiments above, the buffer device 10 has been described as one example of a target to which the electromagnetic valve unit is attached. However, as long as the electromagnetic valve unit is sandwiched between the housing recessed portion and a connection member connected to the control equipment, the electromagnetic valve unit may be attached to another type of control equipment.

Moreover, in the first to third embodiments above, the form in which the tubular body 15 as the pressing member is screwed into and connected to the housing recessed portion 14A has been described by way of example, but fixing by swaging may be employed. Moreover, the connection member may be freely changed depending on, e.g., use environment where the electromagnetic valve unit is attached and the field of the electromagnetic valve unit.

Further, in the first to third embodiments above, the form in which an upper surface of the deformation portion of the elastic member is in a flat shape in the circumferential direction has been described by way of example, but the present invention is not limited to such a form. A protrusion may be provided on the upper surface of the deformation portion of the elastic member. According to such a configuration, sandwiching force is concentrated on the protrusion when the deformation portion is, in the axial direction, sandwiched between the receiving portion of the housing recessed portion and the shoulder portion of the electromagnetic valve unit, and therefore, repulsive force in the axial direction can be greatly ensured.

REFERENCE SIGNS LIST

1 Electromagnetic valve unit
2 Coil portion
2b Shoulder portion
2f Recessed portion
3 Solenoid rod (movable iron core)
7 Elastic member
7a Annular portion (deformation portion)
7b Protruded portion
10 Buffer device
14A Housing recessed portion (housing portion)
14d Horizontal surface (receiving portion)
15 Tubular body (pressing member)
22b Shoulder portion
22f Recessed portion
23b Shoulder portion
23d Horizontal surface
23f Recessed portion
72 Elastic member
72b Protruded portion
73 Elastic member
73b Protruded portion
700 Elastic member

The invention claimed is:

1. An electromagnetic valve unit configured to be held sandwiched between a receiving portion of a housing portion of control equipment and a pressing member in an axial direction of the electromagnetic valve unit, comprising:
    a shoulder portion configured to be opposed to the receiving portion of the housing portion; and
    an annular elastic member provided with a protruded portion configured to be inserted into a recessed portion formed at the shoulder portion,
    wherein the annular elastic member is further provided with an annular deformation portion that is deformable in the axial direction of the electromagnet valve unit so as not to press the protruded portion in the axial direction,
    the recessed portion and the protruded portion are partially formed in the circumferential direction, and
    a plurality of the recessed portions and a plurality of the protruded portions are arranged in the circumferential direction.

2. The electromagnetic valve unit according to claim 1, wherein
    the recessed portion is formed in the shoulder portion and is configured so as to be recessed in a radially inward direction with a wall portion remaining in the axial direction, and
    the protruded portion is protruded in the radially inward direction.

3. The electromagnetic valve unit according to claim 1, wherein
    the protruded portion is press-fitted in the recessed portion.

4. The electromagnetic valve unit according to claim 1, wherein
    the deformation portion is arranged along an outer peripheral surface of the shoulder portion.

5. The electromagnetic valve unit according to claim 1, wherein
    an outer diameter of the deformation portion is smaller than an inner diameter of the housing portion.

6. The electromagnetic valve unit according to claim 1, wherein
    the recessed portions and the protruded portions are equiangularly arranged in the circumferential direction.

7. The electromagnetic valve unit according to claim 2, wherein
    the protruded portion is press-fitted in the recessed portion.

8. The electromagnetic valve unit according to claim 2, wherein
    the deformation portion is arranged along an outer peripheral surface of the shoulder portion.

9. The electromagnetic valve unit according to claim 2, wherein
    an outer diameter of the deformation portion is smaller than an inner diameter of the housing portion.

10. The electromagnetic valve unit according to claim 2, wherein
    the recessed portions and of the protruded portions are equiangularly arranged in the circumferential direction.

* * * * *